J. C. Pedrick,
Compound Steam Engine.
N° 82,547. Patented Sep. 29, 1868.
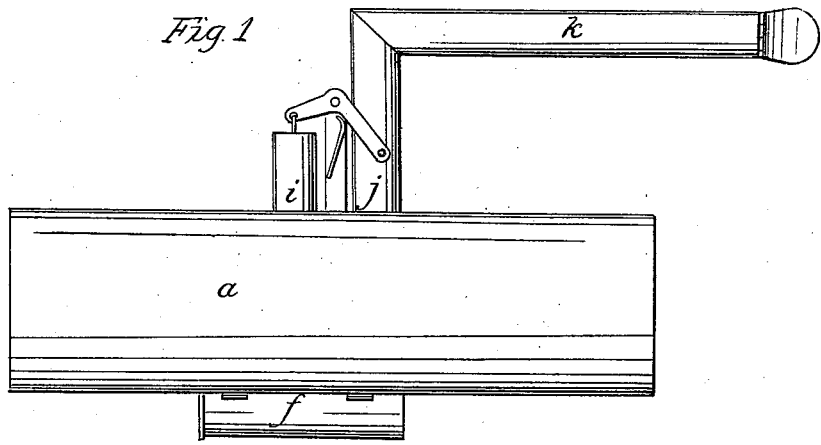
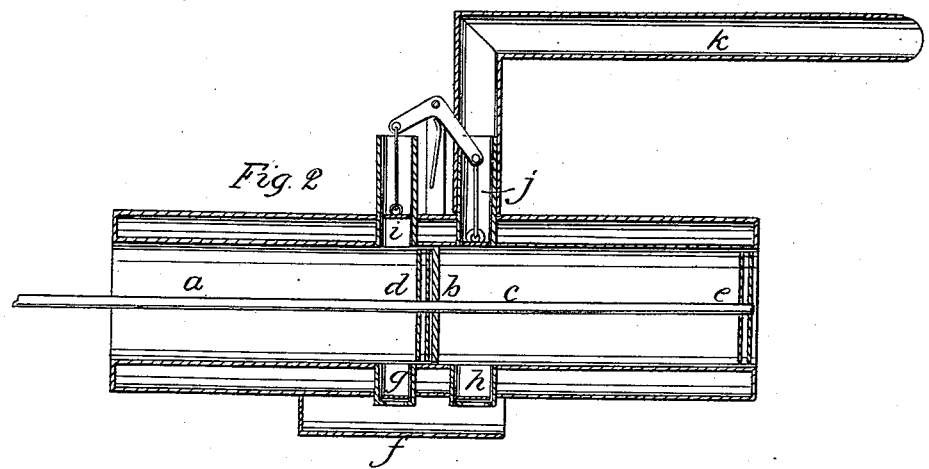
Witnesses:
Thos. T. Everett
J. Smith
Inventor:
John C. Pedrick

United States Patent Office.

JOHN C. PEDRICK, OF WASHINGTON, DISTRICT OF COLUMBIA.

Letters Patent No. 82,547, dated September 29, 1868; antedated September 17, 1868.

IMPROVEMENT IN COMBINED HIGH AND LOW-PRESSURE STEAM-ENGINES.

The Schedule referred to in these Letters Patent and making part of the same.

TO ALL WHOM IT MAY CONCERN:

Be it known that I, JOHN C. PEDRICK, of the city of Washington, in the District of Columbia, have invented a certain new and useful Improvement on Steam-Engines; and I do hereby declare that the following is a full, clear, and exact description of the same, reference being had to the accompanying drawings, and to the letters and marks thereon, which said drawings form part of this specification, and represent a steam-cylinder, with pistons and valves attached thereto, constructed under my invention—

Figure 1 thereof being a top view of the cylinder, valve-chest, and pipes, and

Figure 2 being a view, by longitudinal section, of the same.

In both of these figures, like parts are indicated by like marks and letters.

The cylinder $a$ is divided by a diaphragm or partition, $b$, in which there is a stuffing-box, through which passes the piston-rod $c$, having attached to it two pistons, $d$ and $e$. Both ends of the cylinder are open to the atmosphere, and the cylinder is horizontally located. The valve-chest $f$ and steam-ports $g$ and $h$ are on the one side of the cylinder, and the exhaust-ports and valves $i$ and $j$ on the other side of the cylinder. A pipe, $k$, is shown attached to one of the exhaust-ports, having, at its outer end, a flap-valve, with an inclined seat.

When steam is admitted behind the one piston only, the exhaust of the other piston being open, the two pistons will be travelling in the same direction, the one forced by steam, and the other having the atmosphere following it up. If high steam be used, and the pipe $k$ be surrounded by cold water, or any element of a low temperature, when the exhaust-valve is opened, the high steam will lift the flap-valve, and pass out, while the attenuated or low steam will be condensed, thus giving to the piston the advantage of a vacuum.

In the place of steam, air, or any of the proposed substitutes for steam as a motive-power, may be used with this cylinder, suitable rods, cranks, and mechanical means and devices common to steam-engines being used to communicate the power from the piston-rod to the crank-shaft, or other power or main shaft.

What I claim as my invention, and desire to secure by Letters Patent, is—

The arrangement of the valves $i$ and $j$, and pipe $k$, provided with the flap-valve, with reference to the cylinder, as and for the purpose set forth.

This specification signed, this 25th day of January, 1868.

JOHN C. PEDRICK.

Witnesses:
 THOS. T. EVERETT,
 T. SMITH.